United States Patent
Katzir et al.

(10) Patent No.: US 10,936,774 B1
(45) Date of Patent: Mar. 2, 2021

(54) METHODS FOR IDENTIFYING INTEGRATED CIRCUIT FAILURES CAUSED BY RESET-DOMAIN INTERACTIONS

(71) Applicants: Oren Katzir, Sunnyvale, CA (US); REAL INTENT, INC., Sunnyvale, CA (US)

(72) Inventors: Oren Katzir, San Jose, CA (US); Sanjeev Mahajan, Mountain View, CA (US); Prakash Narain, San Carlos, CA (US); Vishnu Vimjam, San Jose, CA (US)

(73) Assignee: Real Intent, Inc., Sunnyvale, CA (US)

( * ) Notice: Subject to any disclaimer, the term of this patent is extended or adjusted under 35 U.S.C. 154(b) by 0 days.

(21) Appl. No.: 16/276,609

(22) Filed: Feb. 14, 2019

Related U.S. Application Data

(60) Provisional application No. 62/631,409, filed on Feb. 15, 2018.

(51) Int. Cl.
  *G06F 30/33* (2020.01)
  *G06F 30/3323* (2020.01)
  (Continued)

(52) U.S. Cl.
  CPC .............. *G06F 30/33* (2020.01); *G06F 30/20* (2020.01); *G06F 30/30* (2020.01);
  (Continued)

(58) Field of Classification Search
  CPC ...... G01R 31/318541; G01R 31/31858; G06F 30/327; G06F 30/3323; G06F 30/30;
  (Continued)

(56) References Cited

U.S. PATENT DOCUMENTS

| | | | | |
|---|---|---|---|---|
| 3,702,011 A | * | 10/1972 | Armstrong ............ | G06F 11/261 714/33 |
| 3,731,278 A | * | 5/1973 | Eldridge ............ | G11B 20/1205 710/71 |

(Continued)

OTHER PUBLICATIONS

Ashar et al.; "Failures and verification solutions related to untimed paths in SOCs"; 2017 18th International Symposium on Quality Electronic Design (ISQED); Conference Paper; Publisher: IEEE (Year: 2017).*

(Continued)

*Primary Examiner* — Helen Rossoshek
(74) *Attorney, Agent, or Firm* — Pranav Ashar

(57) ABSTRACT

Integrated circuit failures caused by metastability related to assertion of asynchronous resets frequently escape detection before fabrication, causing design respins and severe economic loss. The numerous reset signals, flip-flops and complex logical interactions inherent in an integrated circuit cause an analysis for reset-metastability failures to be extremely noisy, reporting an unmanageable number of false failures and making early removal of failures impractical. Said noisy reporting arises because many flip-flops where reset-metastability manifests do not necessarily cause overall failure. An effective analysis of reset-metastability failures must identify all potential failures, but also must only report true failure potential. The present invention maximizes noise reduction by applying special conditions to identify flip-flops manifesting reset-metastability without causing integrated circuit failure, which can thereby be deemed safe. By reporting only true failure potential, the present invention enables efficient, robust and error-free removal of reset-related failures from an integrated circuit prior to fabrication.

9 Claims, 20 Drawing Sheets

Reset Clamp

Input-Output Flow for RDC Metastability Failure Analysis

(51) Int. Cl.
*G06F 30/30* (2020.01)
*G06F 30/398* (2020.01)
*G06F 30/20* (2020.01)
*G06F 111/04* (2020.01)

(52) U.S. Cl.
CPC ........ *G06F 30/3323* (2020.01); *G06F 30/398* (2020.01); *G06F 2111/04* (2020.01)

(58) Field of Classification Search
CPC .... G06F 30/33; G06F 30/396; G06F 2111/04; G06F 30/20; G06F 30/398; G06F 2111/00
See application file for complete search history.

(56) References Cited

U.S. PATENT DOCUMENTS

| | | | | |
|---|---|---|---|---|
| RE28,811 E * | 5/1976 | Pierce | ............... | H04L 12/4637 370/405 |
| 5,768,159 A * | 6/1998 | Belkadi | .......... | G01R 31/318314 703/19 |
| 5,826,061 A * | 10/1998 | Walp | ............... | G06F 30/33 716/108 |
| 5,953,235 A * | 9/1999 | Gregory | ............... | G06F 30/30 716/104 |
| 6,473,476 B1 * | 10/2002 | Banks | ............... | G06F 1/24 327/117 |
| 6,654,917 B1 * | 11/2003 | Floyd | ............ | G01R 31/318541 714/726 |
| 6,657,463 B2 * | 12/2003 | Velez | ............... | H03L 7/18 327/116 |
| 6,949,954 B2 * | 9/2005 | Nystrom | ............... | G06F 30/30 326/93 |
| 7,039,146 B2 * | 5/2006 | Chiu | ............... | G06F 1/08 375/354 |
| 7,084,679 B2 * | 8/2006 | Hartfiel | ............... | G06F 1/12 327/141 |
| 7,109,754 B1 * | 9/2006 | Zhang | ............... | H03K 5/135 326/38 |
| 7,120,883 B1 * | 10/2006 | van Antwerpen | ...... | G06F 30/34 716/102 |
| 7,292,174 B2 * | 11/2007 | Gangstoe | ............. | H03M 3/462 341/155 |
| 7,320,091 B2 * | 1/2008 | Blaauw | ............... | G06F 9/3861 714/30 |
| 7,366,938 B2 * | 4/2008 | Warren | ............... | G06F 1/24 327/141 |
| 7,366,943 B1 * | 4/2008 | Owen | ............... | G06F 5/10 710/58 |
| 7,380,229 B2 * | 5/2008 | Byrn | ............... | G06F 30/30 716/102 |
| 7,633,826 B2 * | 12/2009 | Kanda | ............... | G11C 17/18 365/196 |
| 7,664,213 B2 * | 2/2010 | Hassan | ............... | H03K 5/125 327/291 |
| 7,711,875 B2 * | 5/2010 | Gloekler | ............ | G06F 13/4054 710/305 |
| 8,122,413 B2 * | 2/2012 | Hom | ............... | G11C 29/32 716/104 |
| 8,504,320 B2 * | 8/2013 | Kojima | ............... | H03K 3/017 327/217 |
| 8,514,004 B2 * | 8/2013 | Hu | ............... | G06F 1/10 327/142 |
| 8,861,153 B2 * | 10/2014 | Kase | ............... | H02H 7/26 361/63 |
| 9,164,842 B2 * | 10/2015 | Flautner | ............. | G06F 11/1604 |
| 9,325,487 B1 * | 4/2016 | Paul | ............... | H03K 19/003 |
| 9,558,309 B2 * | 1/2017 | Beerel | ............... | H03K 3/037 |
| 9,768,757 B1 * | 9/2017 | Gaspard | ............... | H03K 3/0375 |
| 10,038,450 B1 * | 7/2018 | Cory | ............... | H03K 5/135 |
| 10,313,099 B1 * | 6/2019 | Li | ............... | H04L 25/14 |
| 10,599,796 B2 * | 3/2020 | Zhou | ............... | G06F 7/588 |
| 2003/0034795 A1 * | 2/2003 | Otto | ............ | G01R 31/318541 326/16 |
| 2005/0038640 A1 * | 2/2005 | David | ............ | G01R 31/31853 703/16 |
| 2007/0258300 A1 * | 11/2007 | Kelderhouse | ........ | G11C 29/028 365/203 |
| 2015/0161312 A1 * | 6/2015 | Drasny | ............... | G06F 30/30 716/108 |
| 2017/0184664 A1 * | 6/2017 | Nicolaidis | ........ | G01R 31/31703 |
| 2018/0004876 A1 * | 1/2018 | Shah | ............... | G06F 30/33 |
| 2019/0109587 A1 * | 4/2019 | Penney | ............... | H03K 3/0375 |
| 2019/0361820 A1 * | 11/2019 | Ware | ............... | G06F 13/1689 |
| 2020/0097626 A1 * | 3/2020 | Sodagam | ............... | G06F 30/30 |

OTHER PUBLICATIONS

Beer et al.; "Eleven Ways to Boost Your Synchronizer"; IEEE Transactions on Very Large Scale Integration (VLSI) Systems; vol. 23, Issue: 6; Journal Article; Publisher: IEEE (Year: 2015).*

* cited by examiner

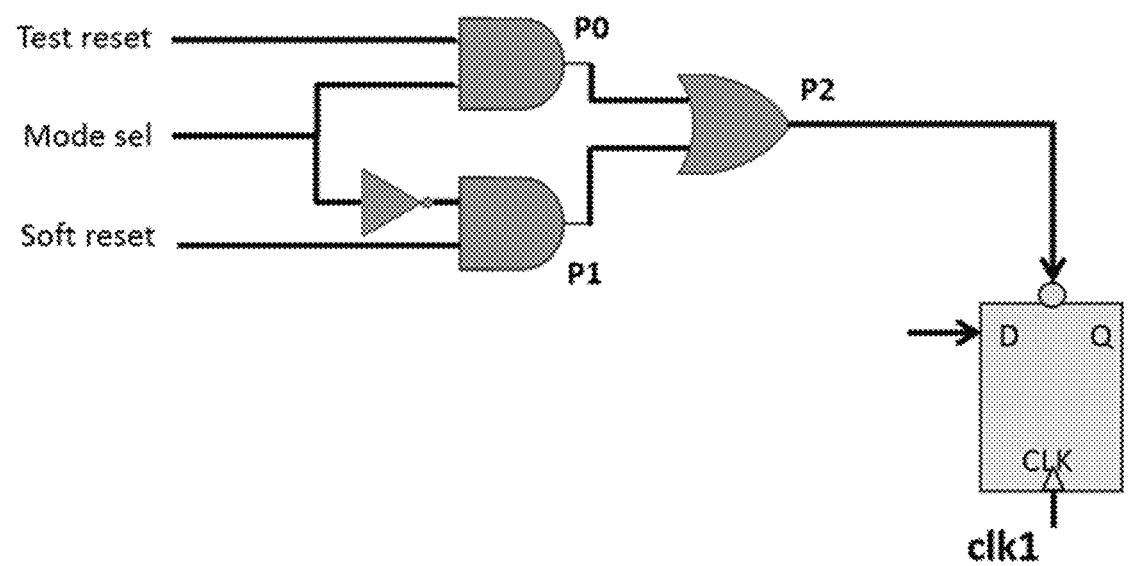
Fig. 1 Reset Glitch Structure

Fig. 2 Reset Glitch Waveform

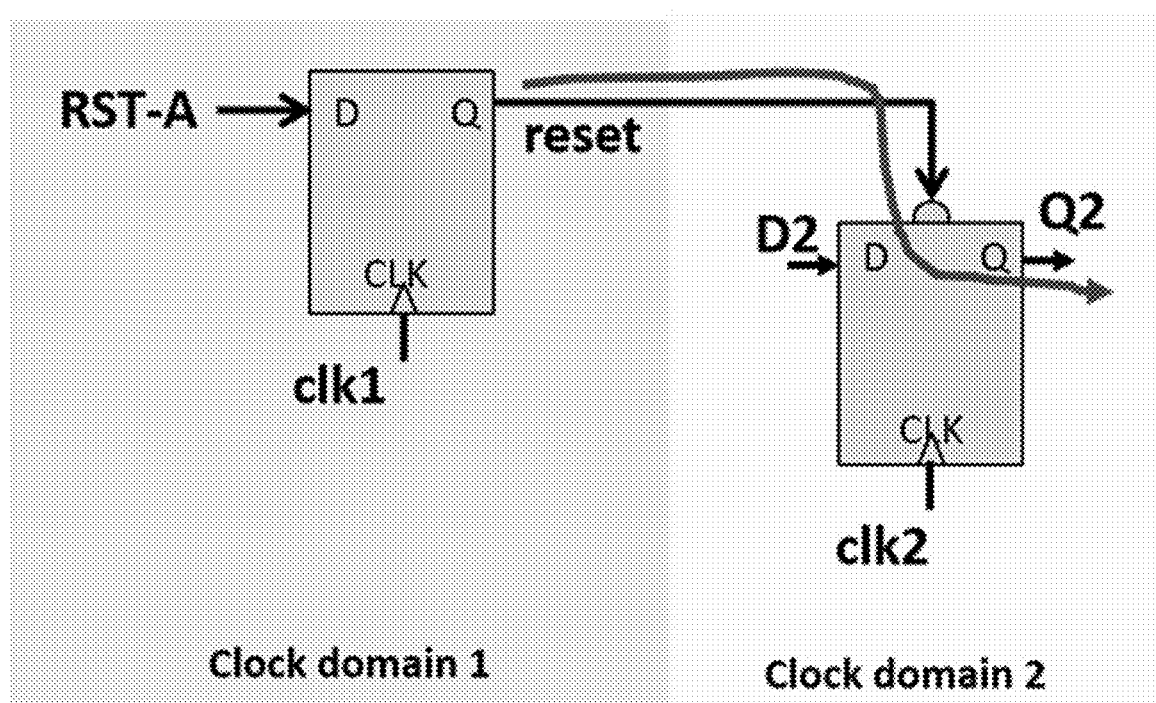
Fig. 3 Reset Crossing Clock Domain Boundary

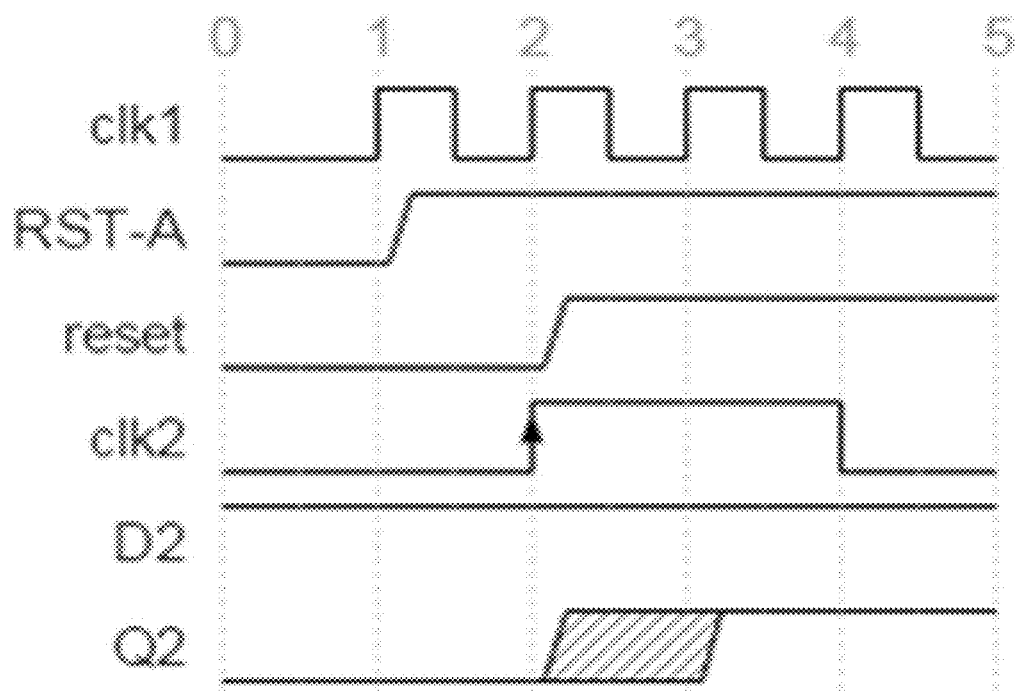
Fig. 4 Waveform Reset Crossing Clock Domain Boundary

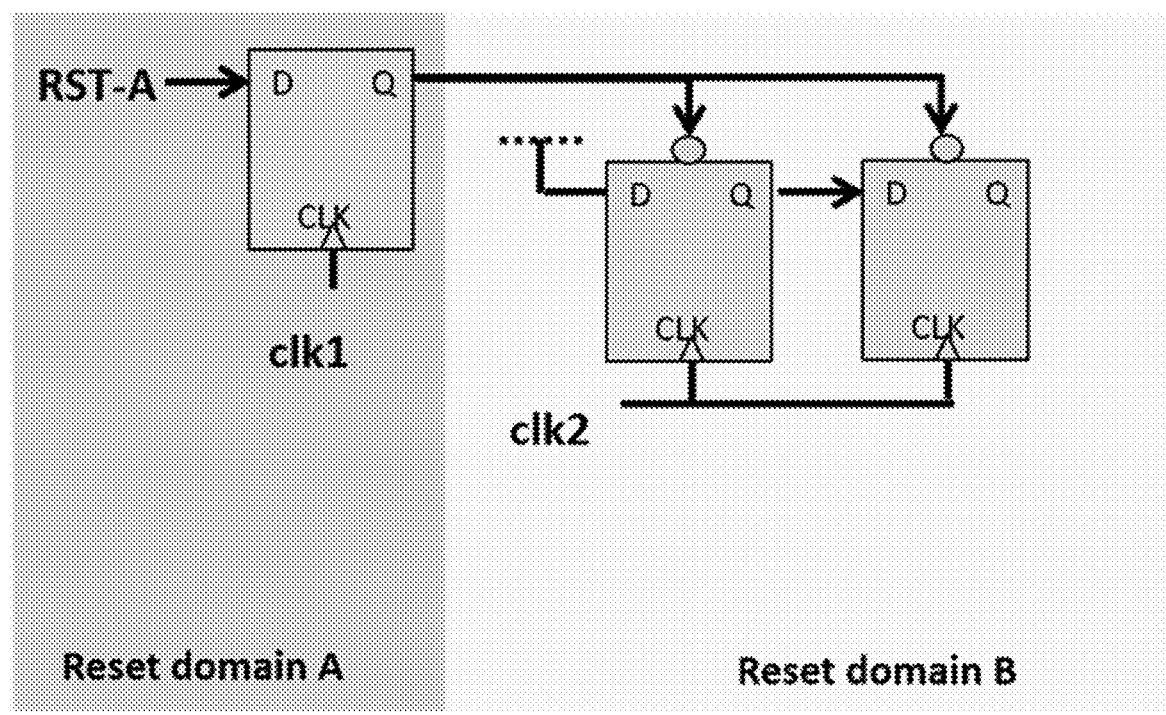
Fig. 5 Reset Synchronizer

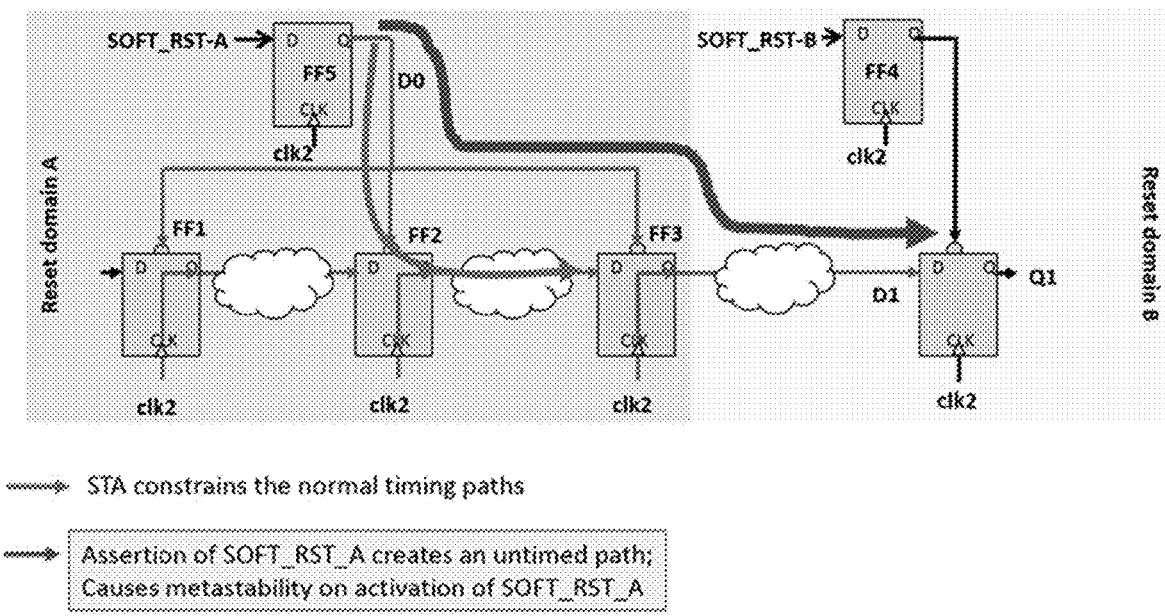
Fig. 6 Reset Crossing Reset-Domain Boundary

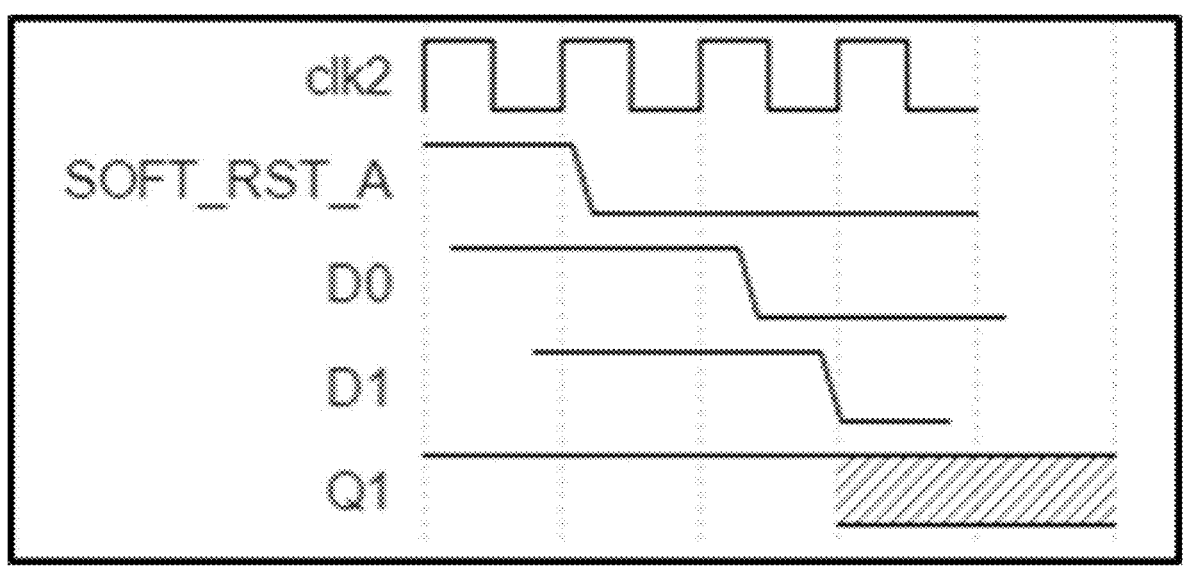
Fig. 7 Metastability-Causing Waveform for Reset Crossing Reset-Domain Boundary

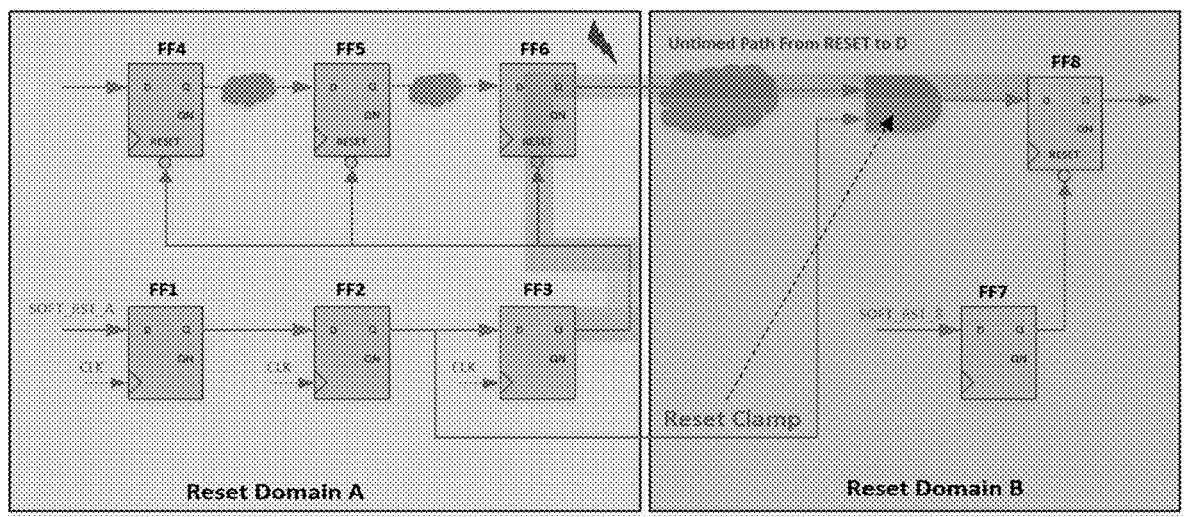
Fig. 8 Reset Clamp

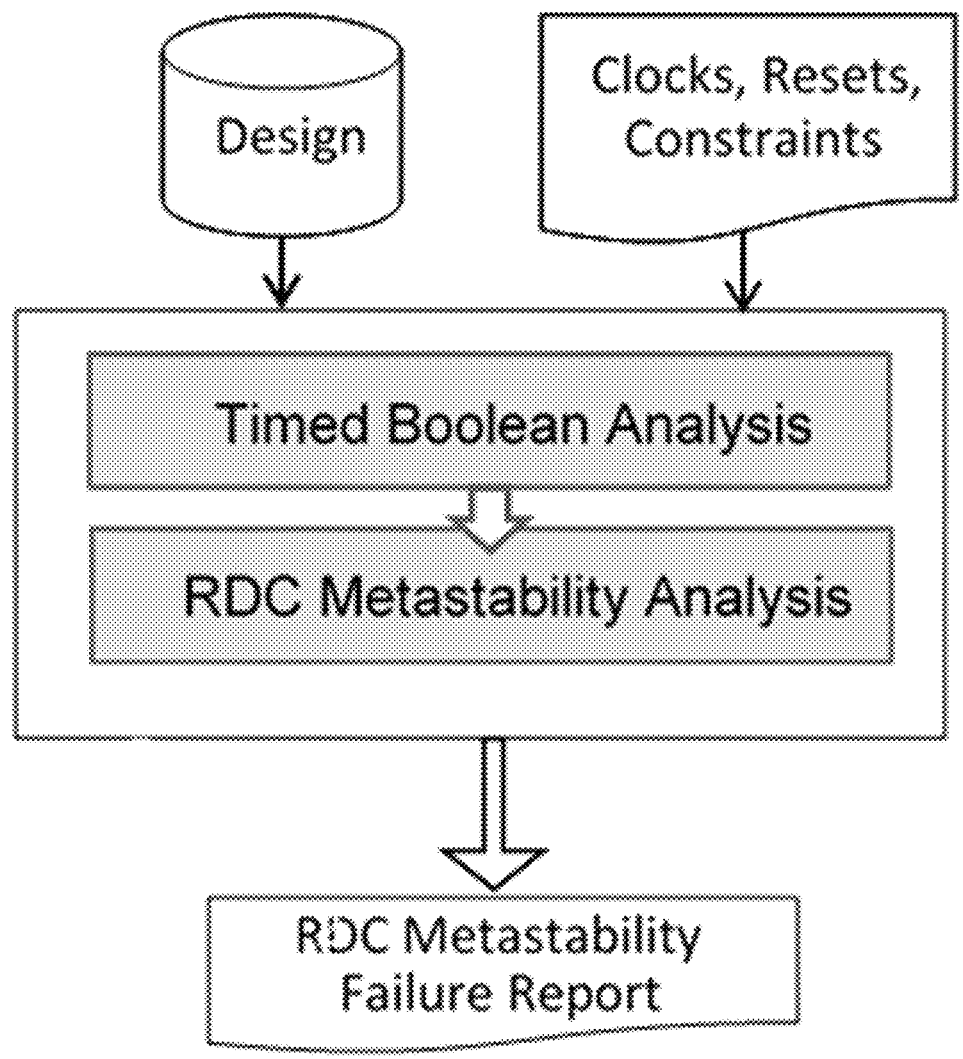
Fig. 9 Input-Output Flow for RDC Metastability Failure Analysis

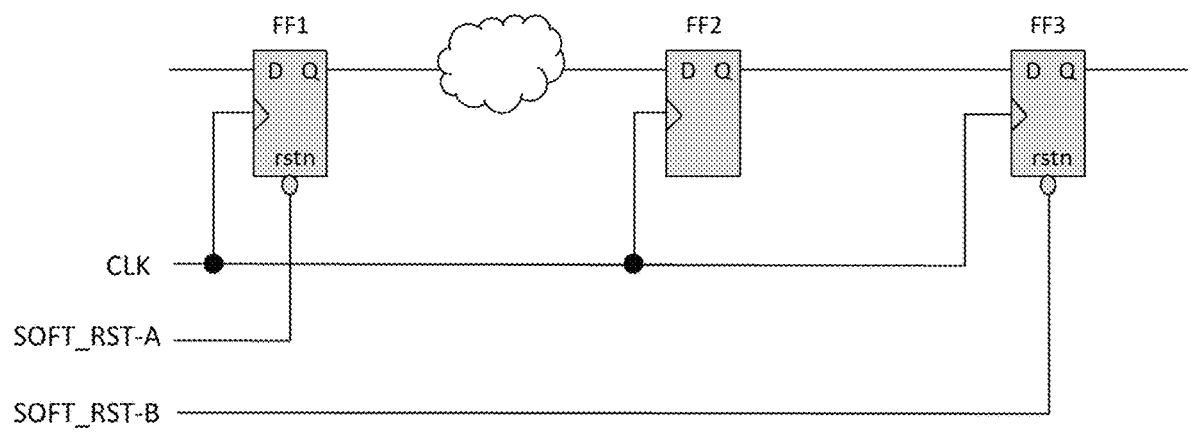
Fig. 10 Example of "Observable" RDC Metastability

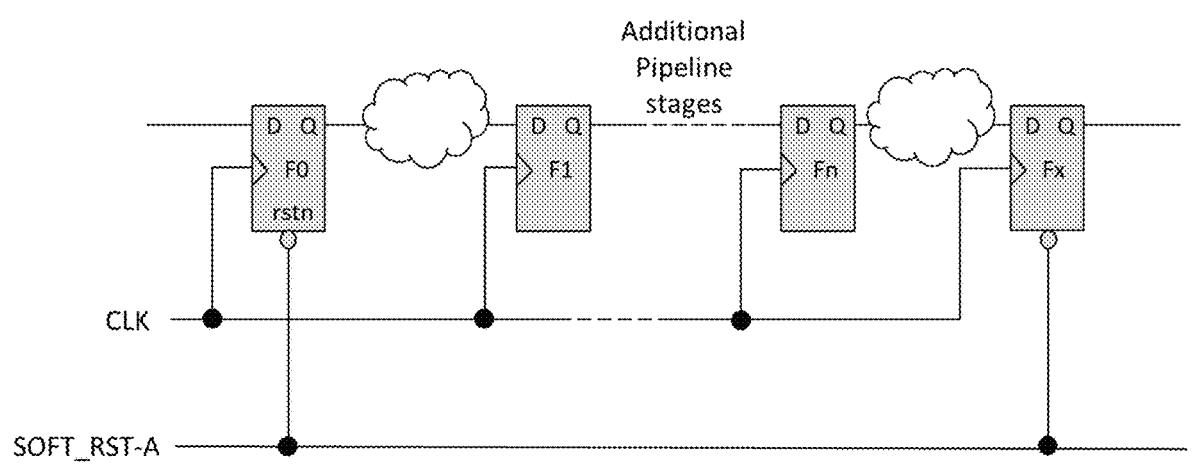
Fig. 11 Example of Observability Detection Based on Pipeline Flip-Flops

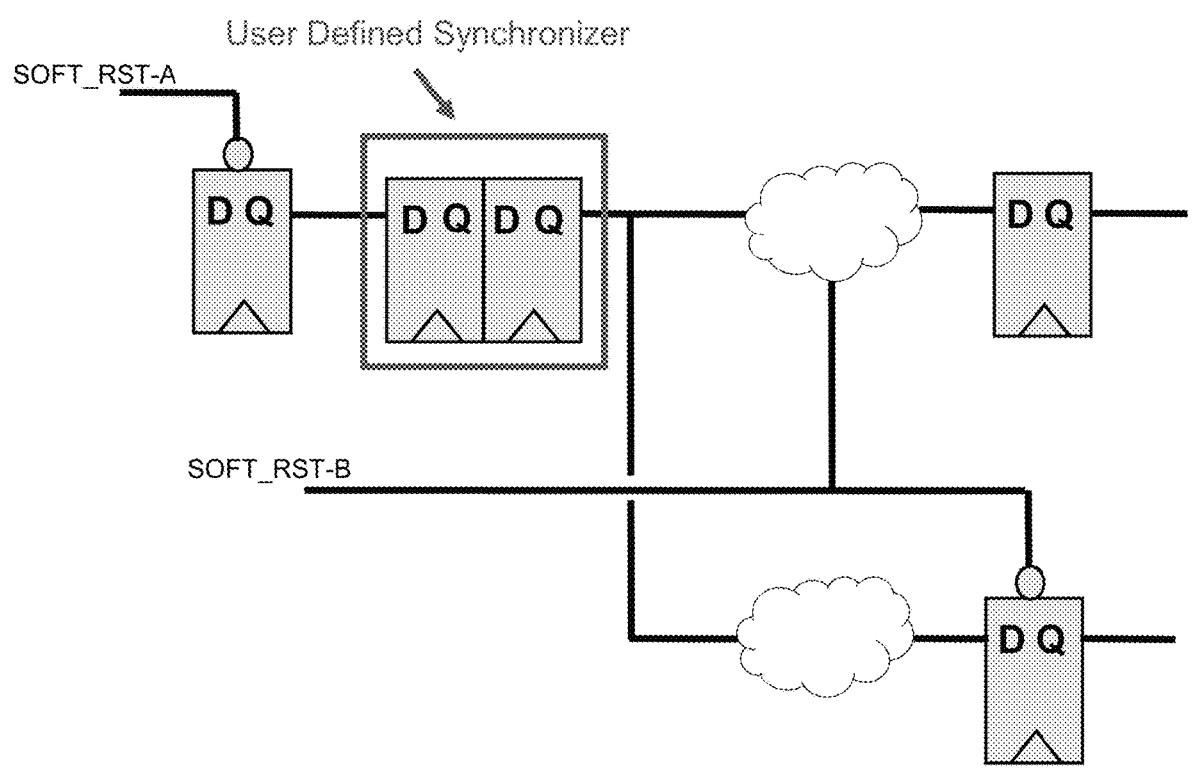
Fig. 12 RDC Observability Example with Synchronizer

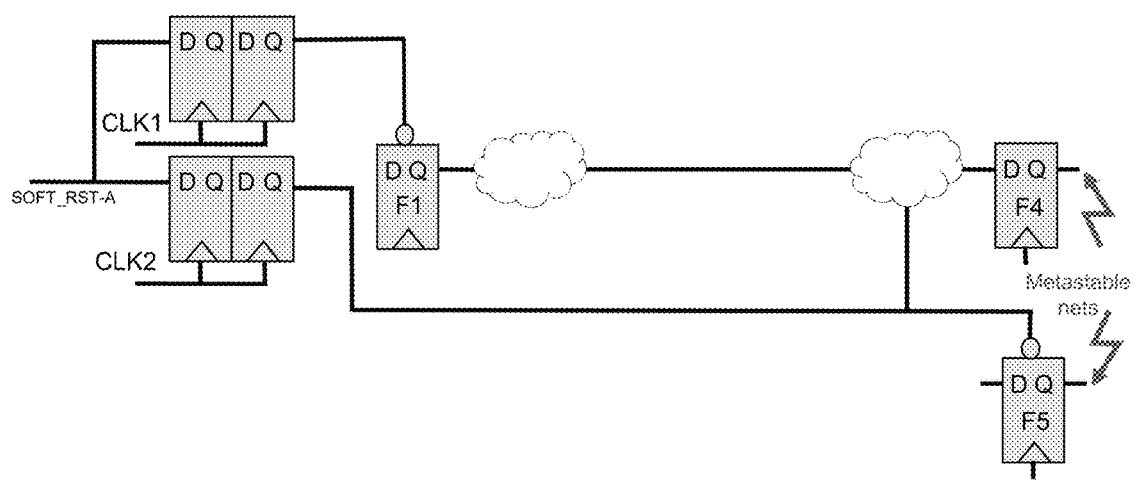
Fig. 13 Example of RDC Metastable Flip-Flops in Same Reset Domain, But Sync'ed to Different but Mutually Synchronous Clocks

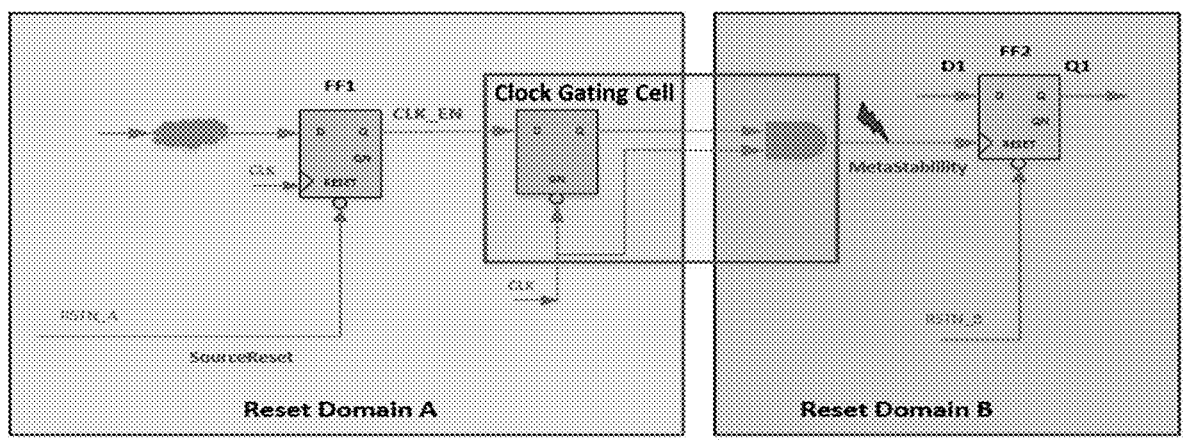
Fig. 14 Reset Metastability in Clock-Gating Cells

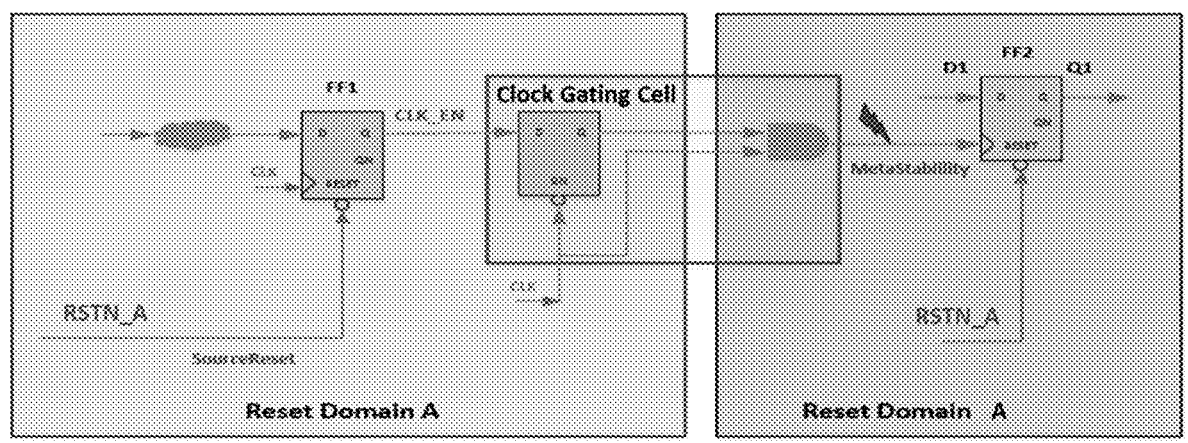
Fig. 15 Observability Determination in Reset-Metastable Clock-Gating Cells

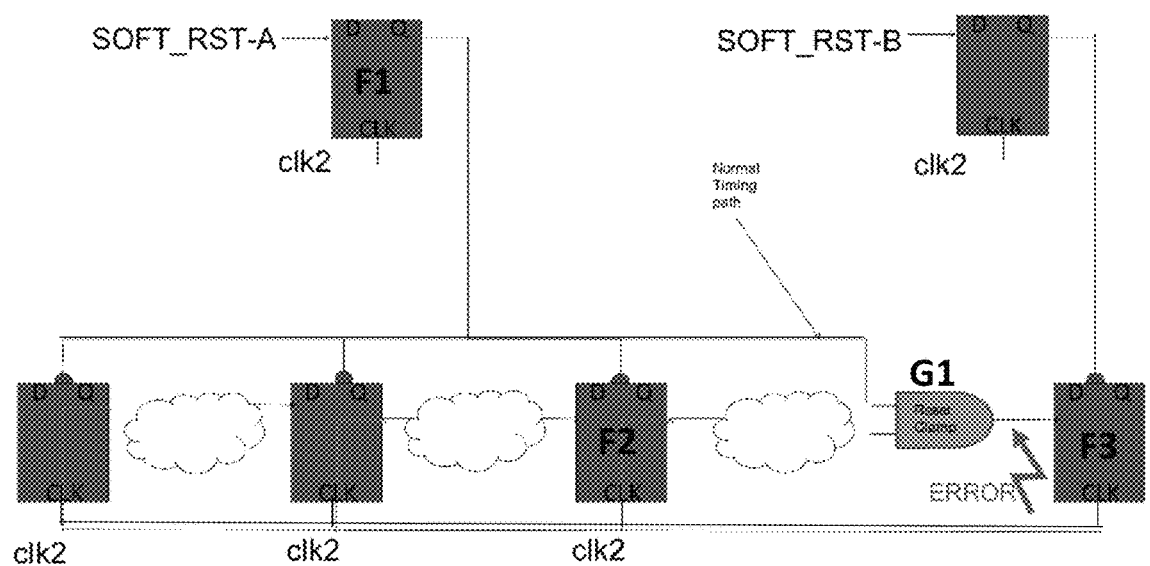
Fig. 16 Incorrect Attempt to Block RDC Metastability with Reset Clamp

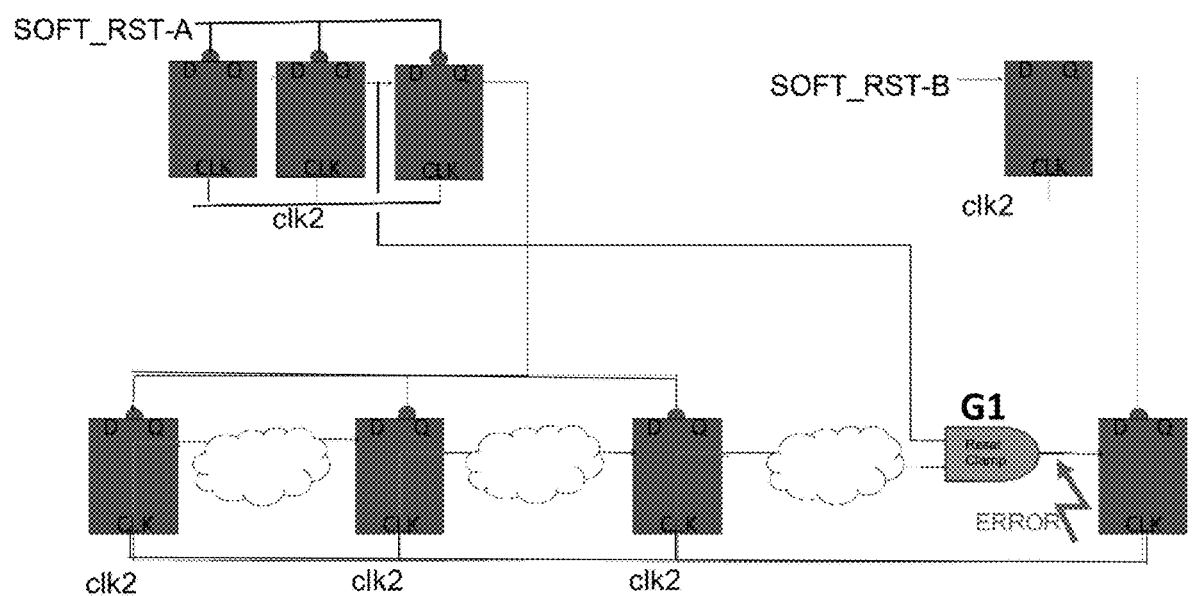
Fig. 17 Also Incorrect Attempt to Block RDC Metastability with Reset Clamp

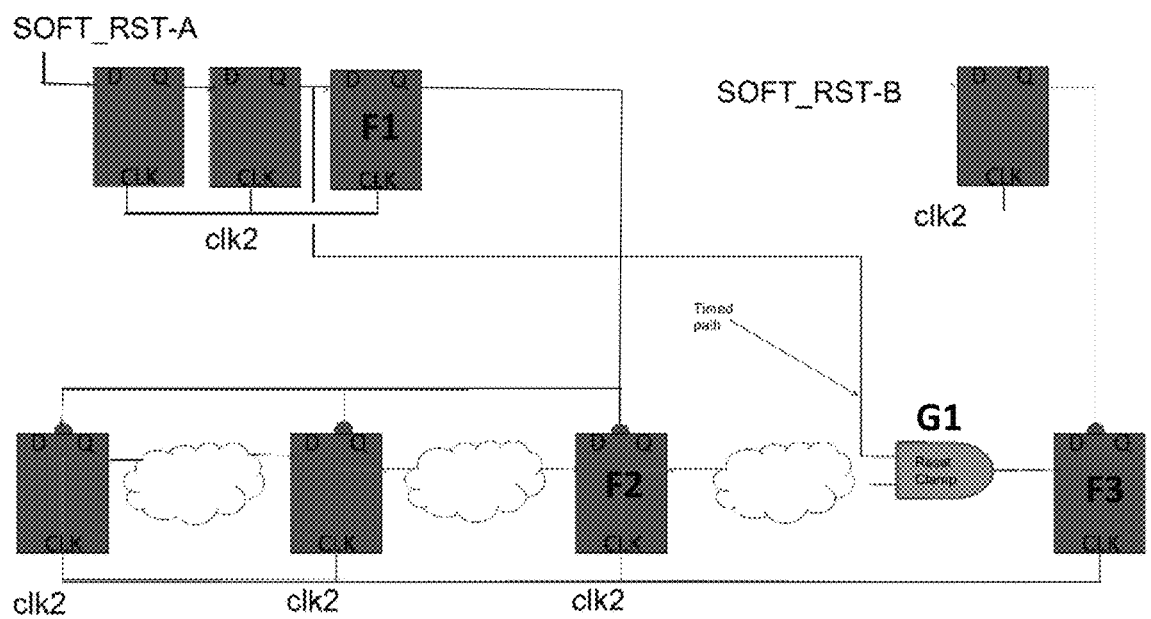
Fig. 18 Correct Blocking of RDC Metastability with Reset Clamp

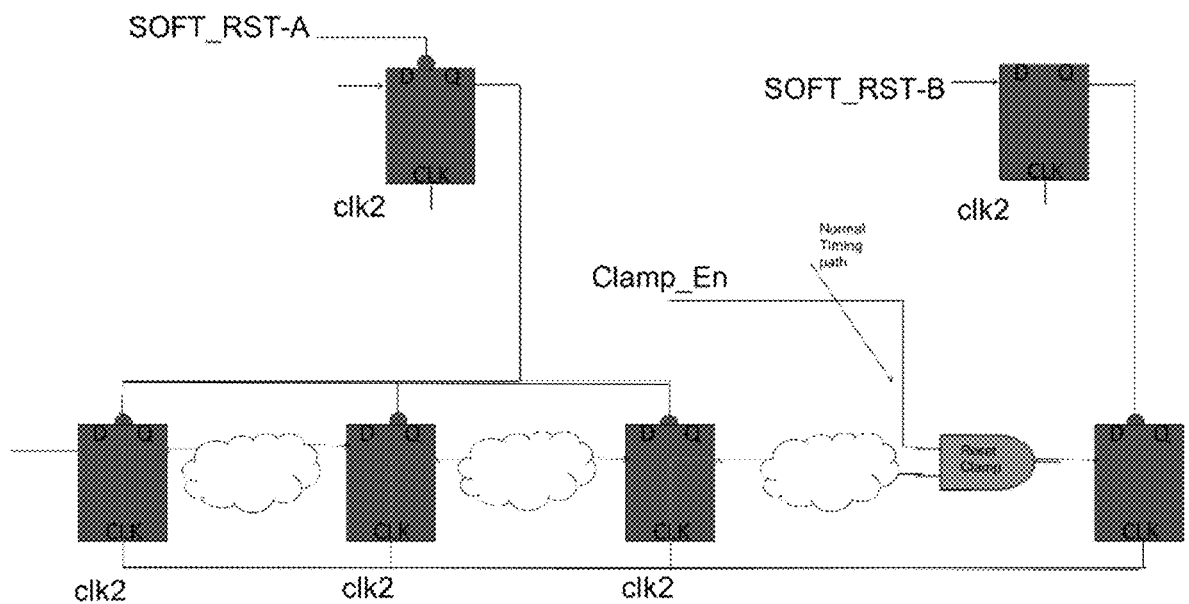
Fig. 19 Internally Generated Reset Clamp Signal to Block RDC Metastability

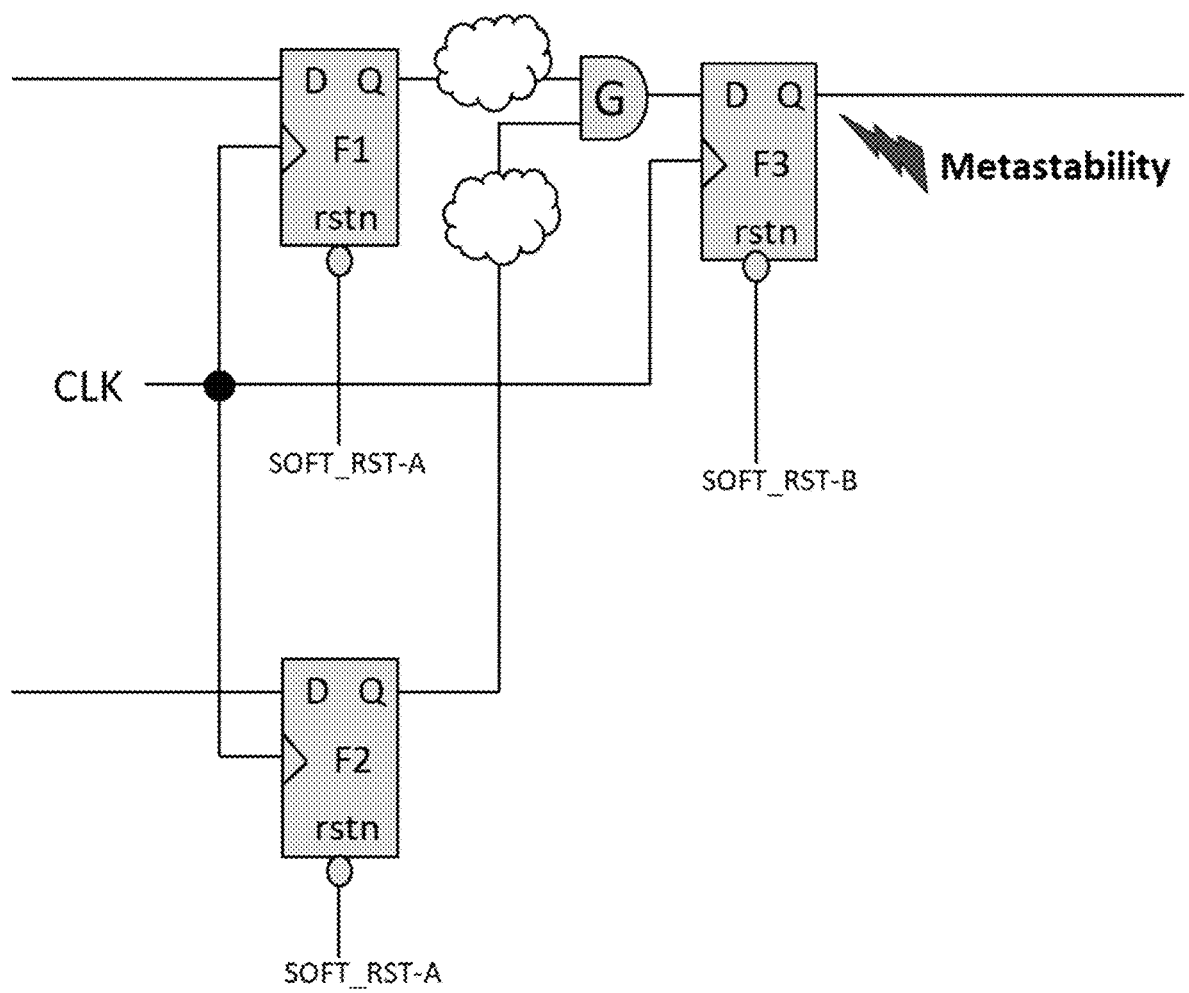
Fig. 20 Example with Multiple Reset-Assertion Flip-Flops

METHODS FOR IDENTIFYING INTEGRATED CIRCUIT FAILURES CAUSED BY RESET-DOMAIN INTERACTIONS

CROSS REFERENCE TO PRIOR-FILED APPLICATIONS

None

REFERENCES CITED

U.S. Patent Documents
U.S. Pat. No. 9,494,969
Other References
A. P. Chowdhury, Neha Agarwal and Ankush Sethi, "Dealing with SoC metastability problems due to Reset Domain Crossing", Embedded.com, Nov. 10, 2013. Available: http://www.embedded.com/design/programming-languages-andtools/4424093/Dealing-with-SoC-metastability-problems-due-to-Reset-Domain-Crossing.
A. P. Chowdhury et al, "Structural Reset Faults in SoC Designs", EE Times Asia, October 2013, Available http://www.eetasia.com/STATIC/PDF/201310/EEOL_2013OCT16_EMS_TA_01.pdf?SOURCES=DOWNLOAD.
A. P. Chowdhury et al, "SoC tool flow techniques for detecting reset domain crossing problems", Emdedded-.com, August 2014, Available https://www.embedded-.com/design/mcus-processors-and-socs/4433434/SoC-tool-flow-techniques-for-detecting-reset-domain-crossing-problems.
Chris Kwok, Priya Viswanathan, Ping Yeung, "Addressing the Challenges of Reset Verification in SoC Designs", DVCON USA, 2015.
Yossi Mirsky, "Comprehensive and Automated Static Tool Based Strategies for the Detection and Resolution of Reset Domain Crossings", DVCON USA, Feb. 27, 2017.
Yossi Mirsky, "Using Static Checks in Automated Flows to Catch Reset Domain Crossings, A Growing Issue Within Today's Complex Designs", SNUG Israel 2016.

FIELD OF INVENTION

The primary purpose of reset in a digital design implemented in an Integrated Circuit (IC) or System on Chip (SoC), is to initialize hardware comprising said digital design by forcing said hardware into a known state, said initialization being performed for correct system operation. Verifying design initialization is a critical part of integrated circuit verification as failures can lead to functional hazards or design re-spins. With increasing design complexity, reset design architecture is also becoming more complex. Modern SoCs often have multiple power-on resets that stage initialization of a chip when power is turned on. Staging minimizes simultaneous switching that can cause other issues, for example electrical issues like excessive voltage drop. In addition to power-on resets, an integrated circuit also has software resets, debug resets, low-power resets, low-voltage resets, global resets and local resets. All these resets can be independently asserted and de-asserted at any time during integrated circuit operation. Engineers must follow fundamental design principles in the implementation of such complex reset schemes. Debilitating failures, which make the manufactured integrated circuit defective, are caused when reset design fundamentals are not followed. Verification techniques are required that aid in ensuring a robust reset scheme in an integrated circuit design that is free of reset-related failures.

The present invention addresses this issue by providing methods by the use of which potential reset-related failures are detected prior to the manufacture of an integrated circuit. In particular, the present invention applies static-analysis methods, the term "static-analysis" being well known in the art as applying to methods that do not rely on simulation, on a model of an integrated circuit design, said model consisting of interconnected logic elements and flip-flops, in order to determine the potential for reset-related failures, and said simulation involving the application of a large number of stimuli on primary inputs of said design. By applying said analysis methods, the present invention enables the manufacture of defect-free integrated circuits.

Said static analysis methods applied in the present invention are designed to be comprehensive and precise, i.e., they are designed to find all design violations that are likely to result in failures in a manufactured integrated circuit. Without this invention, multiple man-months would get spent investigating defective manufactured integrated circuits, when said defect is caused by a reset-related design violation.

BACKGROUND OF INVENTION

Poor reset-design can result in unreliable functional resets, causing intermittent catastrophic failures in a manufactured integrated circuit (a "chip"). These catastrophic errors are not caught reliably by static-analysis methods like Static Timing Analysis (STA), Clock-Domain Crossing (CDC) tools, or through simulation of the design for a large number of input stimuli. Said errors result in failure of manufactured integrated circuits, said failures being difficult to diagnose and expensive to fix.

Reset functionality may cause an integrated circuit to fail for a number of reasons, with the important ones being as follows: (1) metastability (2) glitches on asynchronous resets, or (3) reconvergence of synchronized resets. Metastability may result at a Reset-Domain Crossing (RDC) when an asynchronous reset is asserted or deasserted, said metastability caused by reset assertion being termed "RDC Metastability" in the present application. Glitches may cause spurious resets when an asynchronous reset is generated by combinatorial logic. Functional loss of correlation of synchronized resets may result from reconvergence. From among the aforementioned reasons for reset-related failure, metastability caused by reset assertion at a reset-domain crossing is the most difficult to detect comprehensively and with precision.

Since reset paths are pervasive in a typical integrated circuit design, simplistic RDC Metastability analysis can lead to hundreds of thousands of crossings to be reviewed for potential RDC Metastability failure. The present invention is focused on methods to efficiently, comprehensively and precisely identify said RDC Metastability failures by means of static analysis, i.e. without the use of simulation of a large number of input stimuli.

A basic edge-triggered asynchronous-reset flip-flop has data ("d"), clock ("clk") and reset ("reset") as inputs, and one output ("q"). A flip-flop circuit is designed so that its output is set to the reset value when the reset input is asserted, i.e., reset assertion dominates sensitivity of the flip-flop's output to the clock edge. When reset is inactive, a flip-flop's output is determined by its d-input value just prior to a clock edge. A typical flip-flop's output is edge sensitive to either the 0-to-1 clock edge or the 1-to-0 clock edge, but not to both.

Since reset assertion dominates clock-edge sensitivity in an edge-triggered flip-flop, an unintended transient reset-assertion pulse (a "glitch") on the reset input will cause the flip-flop output to go its reset state and cause a functional failure in the design. It might be caused, for example, by a reconvergent-logic path driving the reset input as shown in FIG. 1. FIG. 2 shows the signal waveforms that would cause the reset input to have an unintended transient reset assertion.

The root cause of reset-related metastability failures is that logical paths arriving at and passing through an asynchronous reset input pin of a flip-flop are not analyzed for timing in STA, said lack of analysis for timing of such paths rendering them "untimed".

For example, in the circuit of FIG. 1, if the aforementioned glitch on the reset input occurs very close in time to the clock edge, and said glitch is short in duration, it can cause the flop-flop to become metastable. Metastability in a flip-flop is the condition where the output value is electrically neither at a definite 0 nor at a definite 1, said condition being caused by the inability of the flip-flop to determine whether to follow its reset assertion or its data input. A metastable state is not desirable because (1) it causes excessive current to be drawn, damaging the circuit, and (2) a metastable state settles randomly to either 0 or 1, causing the functionality of the design to become non-deterministic. Hazards caused by transient changes on the reset inputs are termed "Glitch Errors" in the present invention.

Another common design flaw that creates a metastability hazard is the use of a reset signal from one clock domain to reset a flip-flop in another, asynchronous clock domain. Metastability can occur in said flip-flop when a reset deassertion occurs very close in time to the clock edge of said flip-flop. An example of such a circuit is shown in FIG. 3, and corresponding waveforms causing said metastability are shown in FIG. 4. Q2 becomes metastable when reset is deasserted very close to clk2. A common approach to avoid said metastability hazard caused by reset deassertion is to ensure that said reset is synchronized to the clock domain of any flip-flop it is applied to. An example of such synchronization is shown in FIG. 5. The Q output of the rightmost flip-flop in FIG. 5 is used as a reset signal for flip-flops controlled by clk2 as a circuit practice, said circuit practice ensuring that the reset-deassertion edge arrives sufficiently in advance of a clk2 edge, thereby avoiding metastability at a flip-flop controlled by clk2. Reset-deassertion-related metastability caused by clock-domain crossing of a reset signal is termed "CDC Reset Metastability" in the present invention.

Another cause of reset-related metastability is a situation where an assertion of reset at a flip-flop (termed appropriately as "antecedent reset assertion" and "antecedent reset-assertion flip-flop", respectively, in the present application) causes a downstream flip-flop to become metastable, said downstream flip-flop being connected by a path consisting of logic elements and wires to said antecedent reset-assertion flip-flop, and said downstream flip-flop not being reset at the same time. Said situation is shown by a circuit example in FIG. 6, and associated waveforms causing metastability are shown in FIG. 7. D0 resets FF2, and causing a reset-related transition, said transition arriving at D1, D1 being a data input to a flip-flop, very close to an active clock edge of clk2 at said flip-flop to which D1 is a data input, clk2 being the clock input to said flip-flop. Since the D0-to-D1 path is not timed, a transition at D1 caused by D0 is not guaranteed to arrive sufficiently prior to an active clock edge of clk2, said lack of guarantee implying that a setup time requirement for said flip-flop is not satisfied. Q1, which is said flip-flop's output, can become metastable as a result. Such reset-related metastability caused by an antecedent reset assertion in one reset domain affecting flip-flops in a different reset domain is called "Reset Domain Crossing (RDC) Metastability" in the present invention. RDC Metastability can be avoided by preventing the effect of an antecedent reset assertion transition from reaching an aforementioned downstream flip-flop. One way to achieve said prevention is by including a blocking logic gate (termed "Reset Clamp" in the present application) in all paths from said antecedent reset-assertion flip-flop to said downstream flip-flop. An example of such a scheme is shown in FIG. 8. In said example, whenever a reset is asserted in Reset domain A, a Reset Clamp prevents any transition resulting from said reset assertion in Reset domain A from travelling to a flip-flop in Reset domain B.

Any effects of said Glitch Errors and said CDC Reset Metastability are local relative to where a reset is asserted or deasserted. In fact, an effect is observed exactly at the flip-flop where the reset is applied. Said RDC Metastability, on the other hand, manifests in flip-flops that are downstream, potentially distant, from said antecedent reset assertion point. As a result, in practice, RDC Metastability is more difficult to diagnose and isolate than Glitch Errors and CDC Reset Metastability. Specific reasons for said additional difficulty are as follows:

1. Said downstream flip-flops must be discovered by tracing logical paths originating at said antecedent reset-assertion flip-flops in a design. Given that almost every flip-flop in a design is likely to be a reset-assertion point, and that a typical design has a very large number of flip-flops and logical elements, such path tracing is extremely compute-intensive and memory-intensive.
2. Even when there are paths connecting said antecedent reset-transition flip-flop to downstream flip-flops in a different reset domain by an interconnection of wires and logical elements, not all said paths are able to propagate an antecedent reset transition to said downstream flip-flops. Said path-tracing must also consider the logical values of all inputs into each said traced path to determine whether said antecedent reset transition at the head of said traced path is able to propagate logically to said downstream flip-flop. The complexity of RDC Metastability analysis is, therefore, further increased by a requirement that it compute and consider logical values and their timing during path tracing.
3. A single said antecedent reset transition can propagate to a very large number of said downstream flip-flops. Not all flip-flops that become metastable have the same amount of catastrophic effect in terms of causing integrated circuit failure. RDC-metastability analysis in an integrated circuit must analyze said downstream flip-flops to determine which out of them that can become metastable are likely to cause said integrated circuit to become defective. Without such analysis, RDC Metastability diagnosis can be extremely voluminous, noisy and chaotic.
4. In almost all integrated circuits, a flip-flop can be reset using one of a choice of multiple reset signals. RDC Metastability analysis must analyze for metastability in downstream flip-flops for each possible reset signal that causes an antecedent reset transition.

In summary, efficient and high-quality diagnosis of reset-related failures, especially of RDC Metastability failures, is very important for the manufacture of defect-free integrated circuits. The aforementioned reset-related failures (Glitch Errors, CDC Reset Metastability and RDC Metastability)

have been documented in prior art (for example in the prior art cited in this application), but all prior art is deficient in terms of providing an efficient means to ensure an error-free manufactured integrated circuit because none of any prior art presents methods specifically to alleviate the complexity and to enhance precision in a diagnosis of RDC Metastability failures. The present invention specifically addresses said limitations and deficiencies by reciting methods to reduce the complexity and to enhance the quality of diagnosis for RDC Metastability failures.

SUMMARY OF INVENTION

The present invention in its various embodiments enables a software tool or computer system that efficiently and accurately diagnoses a potential for reset-related failures in integrated circuits. In particular, the present invention is focused on accurate and efficient detection of RDC Metastability failures. To that end, methods are recited in the present invention that automatically extract resets and reset domains in an integrated circuit design, and perform precise RDC Metastability analysis to accurately identify only truly problematic paths. Said methods lead to low-noise results and save valuable analysis time by a user of an integrated circuit verification software or system based on said methods. Said methods are also very efficient, leading to an ability to apply said methods for the verification of very large integrated circuits, and allowing said methods to consume low amounts of computation time and resources.

A typical embodiment of the present invention receives as input (1) a model of an integrated circuit design, said model comprising of gates or other various logical elements, and additionally comprising of flip-flops or other memory elements, connected by wires, and (2) waveform and connectivity information about clock signals, reset signals and other inputs to said integrated circuit, said information being referred to as the "Environment Specification" in the present application. An output of said typical embodiment is a detailed report of a potential for RDC Metastability failures in said model of said integrated circuit design, said report allowing a person to take corrective measures, prior to the manufacture of said integrated circuit, to prevent design flaws that cause RDC Metastability.

The present invention uses Timed Boolean Analysis to determine accurately flip-flops at which RDC Metastability has a potential to occur, said flip-flops being termed "Metastable Flip-Flops" in the present application. Said Timed Boolean Analysis takes as input waveforms associated with clocks, resets and constraints. Said Timed Boolean Analysis propagates said input waveforms through logic gates and paths in said design model to determine at each node in said design a set of "time-value pairs", each said time-value pair being a record of a value change at a node and the time at which said value change occurs. Said Timed Boolean Analysis enables a determination of relative arrivals times of reset-assertion values, reset-deassertion values, aforementioned reset-clamp values, clock-gating signal values, flip-flop and latch enable signal values etc, which together serve to determine operational states of flip-flops in said design and propagation of signals along paths in said design to said flip-flops.

Further, the present invention recites methods to overcome disadvantages of prior art, said methods comprising of steps to analyze RDC-Metastable Flip-Flops in an integrated circuit design in order to determine if said metastability has a potential to cause failure of said integrated circuit, said methods not being recited in prior art. Said methods are described in detail in the following section.

DESCRIPTION OF THE FIGURES

FIG. 1: Reset Glitch Structure

FIG. 2: Reset Glitch Waveform

FIG. 3: Reset Crossing Clock Domain Boundary

FIG. 4: Waveform Reset Crossing Clock Domain Boundary

FIG. 5: Reset Synchronizer

FIG. 6: Reset Crossing Reset-Domain Boundary

FIG. 7: Metastability-Causing Waveform for Reset Crossing Reset-Domain Boundary

FIG. 8: Reset Clamp

FIG. 9: Input-Output Flow for RDC Metastability Failure Analysis

FIG. 10: Example of "Observable" RDC Metastability

FIG. 11: Example of Observability Detection Based on Pipeline Flip-Flops

FIG. 12: RDC Observability Example with Synchronizer

FIG. 13: Example of RDC Metastable Flip-Flops in Same Reset Domain, But Sync'ed to Different but Mutually Synchronous Clocks FIG. 14: Reset Metastability in Clock-Gating Cells FIG. 15: Observability Determination in Reset-Metastable Clock-Gating Cells FIG. 16: Incorrect Attempt to Block RDC Metastability with Reset Clamp FIG. 17: Also Incorrect Attempt to Block RDC Metastability with Reset Clamp FIG. 18: Correct Blocking of RDC Metastability with Reset Clamp FIG. 19: Internally Generated Reset Clamp Signal to Block RDC Metastability FIG. 20: Example with Multiple Reset-Assertion Flip-Flops

DETAILED DESCRIPTION OF THE INVENTION

A description of the present invention, including the various methods and systems therein and some embodiments thereof, is provided in this section in sufficient detail that a person skilled in the art would be able to reproduce them. The description herein is also sufficiently general to enable skilled practitioners to realize straightforward variations and derivations. As such, this description must be interpreted in the widest scope possible.

As described previously in this application, the present invention, in its various embodiments, seeks to provide a software tool or computer system to enable the efficient and accurate determination of a potential for integrated circuit failure caused by RDC Metastability, and design flaws or design errors responsible for said potential failures.

An illustrative embodiment of said software tool or computer system is as shown in FIG. 9 wherein the methods and systems suggested in the present invention receive a design model and an aforementioned Environment Specification as input, and perform the aforementioned Timed Boolean Analysis statically (i.e. prior to and without recourse to simulation of a large number of input stimuli) followed by RDC Metastability analysis to determine potential causes of integrated circuit failure due to said RDC Metastability.

Precise Characterization of Failure Potential of RDC Metastability

Various methods are recited herein for the purpose of determining a potential for integrated circuit failure caused by RDC Metastable flip-flops.

Methods based on Observability Analysis: An RDC Metastable flip-flop will cause an integrated circuit design to fail only when a metastable value on said flip-flop propagates to a second flip-flop in said design such that no reset is being asserted at said second flip-flop in the time window during which said metastable value or its effects propagate to said second flip-flop. If said metastability can propagate to said second flip-flop when no reset is being asserted at said second flip-flop and said second flip-flop's clock input is enabled, said RDC Metastability is deemed to be observable. In a preferred embodiment, the present invention performs said observability analysis on all RDC Metastable flip-flops, and only observable RDC Metastable flip-flops are reported as potential causes of integrated circuit failure. In practice, said observability analysis reduces the number of failures reported by more than one order of magnitude, thereby having a very significant impact in enhancing the precision of RDC Metastability failure analysis.

An example is shown in FIG. 10 of said observable metastability. FF2 is the RDC Metastable flip-flop, with metastability being caused by an assertion of the SOFT_RST-A reset signal. When SOFT_RST-A is asserted, SOFT_RST-B is in the inactive (deasserted) state. The RDC Metastability on FF2 is deemed observable since it is able to propagate along paths consisting of logic gates to flip-flop FF3, which is in the SOFT_RST-B reset domain. Hence, FF2 is reported in this method to be a critical RDC Metastable flip-flop. Additionally, FF3 is reported in this method as a flip-flop to which said RDC Metastability on FF2 propagates. If FF3 had been in the SOFT_RST-A reset domain, FF2 would not have been deemed observable and would not have been reported as a critical RDC Metastable flip-flop.

A preferred embodiment of the present method, for a specific set of reset waveforms, clock waveforms and constraints, comprises the following steps:
1. Perform Timed Boolean analysis and path tracing to determine all RDC Metastable flip-flops.
2. For each RDC Metastable flip-flop identified in step 1,
   a. Perform path-tracing based on a graph search algorithm (for example, depth-first or breadth-first search) coupled with Timed Boolean Analysis to determine whether said RDC Metastability can propagate to a second flip-flop that is not being reset when any effects of said RDC Metastability arrive at said second flip-flop and said second flip-flop's input clock is enabled.
   b. Enumerate all said second flip-flops in Step 2a.
   c. If some said second flip-flops are found, deem said RDC Metastable flip-flop as observable, and add said RDC Metastable flip-flop and all said second flip-flops to the output report. Return to Step 2 to process a next RDC Metastable flip-flop.
   d. If no said second flip-flops are found, do not report said RDC Metastable flip-flop. Return to Step 2 to process a next RDC Metastable flip-flop.

Whereas the above embodiment is detailed enough for implementation and reproduction by practitioners of the art, it is also a general approach based on which a skilled practitioner would be able to derive variations to achieve the same goal of identifying said observable RDC Metastable flip-flops. As such, the above embodiment must be interpreted in the widest scope possible.

Methods for Observability Analysis in the Presence of Pipeline Flip-Flops: A set of flip-flops is said to be pipelined if said flip-flops are interconnected such that, except for one of the said flip-flops, the output of each flip-flop only connects, either directly or through intervening logic gates, to one other flip-flop in said set. For example, in FIG. 11, flip-flops F1 through Fn form an n-flip-flop pipeline. When a metastable output of an aforementioned RDC Metastable flip-flop only propagates through a flip-flop pipeline (for example, as shown in FIG. 11, which has the RDC Metastable flip-flop F1 propagating only through the F1-Fn pipeline), further considerations are applied in the present method to determine when an RDC Metastable flip-flop should be considered observable. In particular, an RDC Metastable flip-flop (flip-flop F1 in FIG. 11), whose output propagates through a flip-flop pipeline, is deemed observable only if the output of the final flip-flop in the pipeline (flip-flop Fn in FIG. 11) propagates to downstream flip-flops that are not being reset at the time an RDC Metastability effect propagates to said downstream flip-flops and said downstream flip-flops have their input clocks enabled. For example, in FIG. 11, Fn only propagates to flip-flop Fx, which, like F0, is also being reset by SOFT_RST-A. Since Fx will have its reset inputs active when the effect of RDC Metastability at F1 propagates to it, F1 is deemed to be not-observable, and is not reported as an RDC Metastable flip-flop. If Fx was not being reset when RDC Metastability at F1 propagated to it, F1 would be deemed observable and would be reported, said reporting being further controlled by a parameter indicating a depth of said pipeline that is deemed acceptable for reporting. If a pipeline's depth is less than the said acceptable depth, said RDC Metastable flip-flop is deemed observable without further qualification. If said pipeline depth exceeds said acceptable depth, said RDC Metastable flop is considered observable and is also assigned a special tag to indicate that said observability is through a pipeline exceeding said specified acceptable depth limit.

A preferred embodiment of the present method, for a specific set of reset waveforms, clock waveforms and constraints, comprises the following steps:
1. Perform Timed Boolean Analysis and path tracing to determine all RDC Metastable flip-flops.
2. For each RDC Metastable flip-flop identified in step 1,
   a. Perform path-tracing to determine if said RDC Metastable flip-flop is part of an aforementioned pipeline.
   b. If said RDC Metastable flop-flop is not part of an aforementioned pipeline, the present method does not apply to it. Return to Step 2 to process a next RDC Metastable flip-flop.
   c. Determine a final flip-flop in said pipeline starting at said RDC Metastable flip-flop. Perform path-tracing based on a graph search algorithm (for example, depth-first or breadth-first search) coupled with Timed Boolean Analysis to determine whether said final flip-flop can propagate to a second flip-flop that is not being reset at the time said propagation effect arrives at said second flip-flop and whose input clock is enabled.
   d. Enumerate all said second flip-flops in Step 2c.
   e. If some said second flip-flops are found, deem said RDC Metastable flip-flop as observable, and add said RDC Metastable flip-flop and all said second flip-flops to a report. Return to Step 2 to process a next RDC Metastable flip-flop.
   f. If no said second flip-flops are found, do not report said RDC Metastable flip-flop. Return to Step 2 to process a next RDC Metastable flip-flop.

As an adjunct to the above embodiment, if said flip-flop pipeline is a pre-characterized synchronizer cell, said RDC Metastable flip-flop is not deemed observable even if the output of said synchronizer cell propagates to said second flip-flop that is not being reset at the time. An example of such a situation is shown in FIG. 12. The check for whether an RDC Metastable flip-flop is part of said synchronizer is correspondingly added to the above embodiment in step 2b.

Whereas the above embodiment is detailed enough for implementation and reproduction by practitioners of the art, it also a general approach based on which a skilled practitioner would be able to derive variations to achieve the same goal of identifying said observable RDC Metastable flip-flops. As such, the above embodiment must be interpreted in the widest scope possible.

Methods for Observability Analysis When RDC Metastable Flip-Flop is in the Same Reset Domain, But Synchronized to Different Clock Frequency: When a primary reset (SOFT_RST-A in FIG. 13) of an RDC Metastable flip-flop (F4 and F5 in FIG. 13) is also a primary reset (also SOFT_RST-A in FIG. 13) of an associated Reset flip-flop (F1 in FIG. 13), such that the immediate reset inputs of said RDC Metastable flip-flop and said Reset flip-flop are synchronized to two relatively-synchronous clocks of different frequencies (CLK1 and CLK2 in FIG. 13), special considerations are applied in determining whether said RDC Metastable flip-flop should be considered observable. Even though flip-flops like F4 and F5 would become metastable when SOFT_RST-A is asserted, their metastability would be manifest only for the duration between the active edges of their respective clocks (CLK1 and CLK2 in FIG. 13). As such, a reset assertion at an RDC Metastable flip-flop would be guaranteed to arrive in a predictable amount of time. Specifically, if such an RDC Metastable flip-flop propagates only to flip-flops in the same reset domain (for example, if F4 in FIG. 13 only propagates to flip-flops reset by the primary reset SOFT_RST-A), said RDC Metastable flip-flop is not considered observable. Also, even if said RDC Metastable flip-flop fans out to flip-flops in other reset domains (for example, F5 in FIG. 13), said RDC Metastable flip-flop is not deemed a high-priority observable flip-flop since its reset assertion event is guaranteed to arrive in a predictable amount of time after it becomes metastable, i.e., the metastability on said RDC Metastable flip-flop is guaranteed to be of a well-defined, and usually short duration. In general, if RDC Metastability is of a well-defined and short duration, whatever the cause of such an effect, said RDC Metastability is accorded special attention as in the present method.

A preferred embodiment of the present method, for a specific set of reset waveforms, clock waveforms and constraints, comprises the following steps:
1. Perform Timed Boolean Analysis and path tracing to determine all RDC Metastable flip-flops.
2. For each RDC Metastable flip-flop identified in step 1,
   a. Determine if said RDC Metastable flip-flop is in the same reset domain as its associated Reset flip-flop, but with resets of the two said flip-flops synchronized to different relatively-synchronous clocks.
   b. If the answer to Step 2a is a "no", return to Step 2 to process a next RDC Metastable flip-flop.
   c. Determine if said RDC Metastable flip-flop propagates only to flip-flops in the same reset domain as itself. If the answer is "yes", mark said RDC Metastable flip-flop as not observable. Return to Step 2 to process a next RDC Metastable flip-flop.
   d. Enumerate and report all flip-flops to which said RDC Metastable flip-flop propagates and which of said flip-flops are not in the same reset domain as said RDC Metastable flip-flop. Mark said RDC Metastable flip-flop as being observable with low priority, and with a special attribute indicating that said RDC Metastable flip-flop has a frequency-difference relationship with said Reset flip-flop. Return to Step 2 to process a next RDC Metastable flip-flop.

Whereas the above embodiment is detailed enough for implementation and reproduction by practitioners of the art, it also a general approach based on which a skilled practitioner would be able to derive variations to achieve the same goal of identifying said observable RDC Metastable flip-flops. As such, the above embodiment must be interpreted in the widest scope possible.

Methods for Observability Analysis in the Presence of Reset-Metastability at a Clock-Gating Cell: When a reset assertion value propagates to an input of a clock-gating cell such that a flip-flop or latch in said clock-gating cell is not being reset at that time, the output of the clock gating cell can become metastable, and must be treated in the same manner as aforementioned RDC Metastable flip-flops. For example, the clock-gating cell in FIG. 14 receives a reset assertion value from a different reset domain and, as a result, its gated-clock output becomes metastable. The metastable gated-clock output of said cell eventually propagates to the clock inputs of flip-flop FF2 in FIG. 14 and causes metastability in said flip-flop. As with aforementioned RDC Metastable flip-flops, metastability at the output of a clock-gating cell is not material in terms of causing integrated circuit failure when it only propagates to flip-flops in the same reset domain as the Reset flip-flop. For example, in FIG. 15, even though the clock-gating cell can become metastable as a result of a reset assertion value from Reset flip-flop FF1, said metastable value only propagates to flip-flop FF2, which receives the same reset as FF1. As a result, the RDC Metastable clock-gating cell in FIG. 15 is not considered observable and is not reported as a potential cause of RDC metastability failure.

A preferred embodiment of the present method, for a specific set of reset waveforms, clock waveforms and constraints, comprises the following steps:
1. Perform Timed Boolean Analysis and path tracing to determine all RDC Metastable clock-gating cells and Reset flip-flops associated with them.
2. For each RDC Metastable clock-gating cell identified in step 1,
   a. Determine if said RDC Metastable clock-gating cell propagates to any fanout flip-flops in a different reset domain than a Reset flip-flop associated with said RDC Metastable clock-gating cell.
   b. If the answer to Step 2a is a "no", mark said RDC Metastable clock-gating cell as non-observable and return to Step 2 to process a next RDC Metastable clock-gating cell.
   c. Mark said RDC Metastable clock-gating cell as observable. Enumerate all said fanout flip-flops and report one or a small number of them along with said observable RDC Metastable clock-gating cell. Return to Step 2 to process a next RDC Metastable clock-gating cell.

Whereas the above embodiment is detailed enough for implementation and reproduction by practitioners of the art, it also a general approach based on which a skilled practitioner would be able to derive variations to achieve the same goal of identifying said observable RDC Metastable flip-flops. As such, the above embodiment must be interpreted in the widest scope possible.

Methods for RDC Metastability Analysis with Consideration of Timing in the Presence of Reset Clamp: A common approach to prevent RDC Metastability is to apply an aforementioned Reset Clamp signal on a reset-propagation path to prevent a reset-assertion transition from propagating to downstream flip-flops that would otherwise become RDC Metastable. The arrival of said Reset Clamp signal at a blocking gate should be designed such that it prevents metastability in downstream flip-flops at the input-clock edges of said downstream flip-flop, said prevention of metastability applying to said clock-edges both preceding and following the reset assertion. Metastability at said following clock edge is prevented by making sure that said Reset Clamp signal arrives sufficiently-early at said blocking gate, said sufficiently-early arrival of said Reset Clamp signal is determined relative to the clock waveform of a potentially RDC Metastable flip-flop or latch in the transitive fanout of said blocking gate. The present invention determines a "Cleanliness Profile" for every Reset Clamp transition event relative to clocks in said transitive fanout flip-flops and latches. Said Cleanliness Profile is used to determine an ability of said Reset Clamp signal to block a reset-assertion transition from propagating to said transitive fanout flip-flops or latches. A preferred consideration to determine said sufficiently-early arrival of said Reset Clamp signal is that said arrival be able to block the capture of a reset-assertion event at a first clock-edge at said transitive-fanout flip-flop or latch. In order to prevent metastability at said preceding clock edge, a path of said Reset Clamp signal to a D-input of said downstream flip-flop must be timed and said timing must respect a requirement of said downstream flip-flop. The present method ensures that said Reset Clamp signal arrives early enough to block a reset assertion transition, and that any path of said Reset Clamp signal to a D-input of said downstream flip-flop is timed. If either requirement is not satisfied, said downstream flip-flop is deemed as being RDC Metastable. The requirement that a Reset Clamp path be timed is called a "Timed RDC Check" in the present application.

FIG. 16 shows an incorrect attempt to apply a Reset Clamp signal. The Reset Clamp Signal at AND gate G1 is not guaranteed to arrive in time to block a reset assertion transition at flip-flop F2. As a result, even though the path of said Reset Clamp Signal to the D-input of the downstream flip-flop F3 is timed, an application of said Reset Clamp signal in FIG. 16 will be deemed incorrect and the downstream flip-flop F3 will be deemed RDC Metastable.

FIG. 17 shows an attempt to have said Reset Clamp Signal arrive in time to block propagation of reset assertion at G1. In practice, said early-arrival requirement will be satisfied, but said requirement that said Reset Clamp signal be timed is not satisfied since path of said Reset Clamp signal begins with an asynchronous reset, and is thereby not timed.

FIG. 18 shows a correct way to generate said Reset Clamp Signal. It is guaranteed to arrive in time at G1 to block a reset assertion transition from flip-flop F2, and the path of said Reset Clamp Signal to the D-input of flip-flop F3 is timed and can, therefore, be designed to respect a prespecified timing requirement at F3. Since said early-arrival requirement and said requirement that said Reset Clamp signal be timed are both satisfied, flip-flop F3 is tagged as not being RDC Metastable.

FIG. 19 shows a circuit in which a Reset Clamp Signal is generated by internal logic or is an external input. In either case, waveforms on said Reset Clamp signal must be analyzed using Timed Boolean Analysis to ensure that said early-arrival and flip-flop timing requirements are satisfied.

A preferred embodiment of the present method, for a specific set of reset waveforms, clock waveforms and constraints, comprises the following steps:
1. Perform Timed Boolean Analysis and path tracing to determine all RDC Metastable flip-flops, where said RDC Metastability is caused by propagation of a reset assertion transition to said RDC Metastable flip-flops due to an absence of blocking signals, or due a lack of on-time arrival of said blocking signals.
2. During said analysis in Step 1, determine said blocking signals on each said reset-assertion path such that said blocking signals prevent a reset assertion from propagating to a downstream flip-flop.
3. For each of said blocking signals identified in Step 2, determine if the path of said blocking signal to a D-input of each downstream flip-flop, said downstream flip-flop being the one to which a reset assertion would have propagated if not for the presence of said blocking signal, is timed. Said determination of whether said path is timed is based on (a) whether a determination of arrival time at the end of said path is dependent on the timing of a signal that is asynchronous or synchronous relative to signals synchronized to a clock input of said downstream flip-flop (asynchronous is untimed and synchronous is timed), and (b) whether said path travels through design objects, or ports of said design objects (for example an asynchronous reset port of a flip-flop), that are nominally not analyzed for timing during Static Timing Analysis. If said path is determined to not be timed, said downstream flip-flop is deemed to have failed the aforementioned Timed RDC Check and is tagged as being RDC Metastable.

Whereas the above embodiment is detailed enough for implementation and reproduction by practitioners of the art, it also a general approach based on which a skilled practitioner would be able to derive variations to achieve the same goal of identifying said observable RDC Metastable flip-flops. As such, the above embodiment must be interpreted in the widest scope possible.

Methods for RDC Analysis in the Presence of Multiple Reset Flip-Flops or Multiple RDC Metastable Flip-Flops: In some situations, reset-assertion effects from multiple Reset Assertion flip-flops have an opportunity to propagate to an RDC Metastable flip-flop. As multiple reset-assertion effects propagate to a single RDC Metastable flip-flop, said reset-assertion effects will converge at some gates along the propagation paths. Which of said multiple reset-assertion effects end up being the actual causes of RDC Metastability at said single RDC Metastable flip-flop depends on the relative timing of said reset-assertion effects as they converge along said propagation paths. The present invention performs said Timed Boolean Analysis on all reset-assertion effects to determine said relative timing at said convergence points. Boolean analysis at said convergence points is then used in the present invention to determine which (one or more) of said reset-assertion effects propagates to said single RDC Metastable flip-flop, said determination of propagation being used to determine Reset Assertion flip-flops associated with said single RDC Metastable flip-flop. For example, in FIG. 20, reset-assertion effects from both flip-flops F1 and F2 have ability to cause metastability at the downstream RDC Metastable flip-flop F3. Which of F1 and F2 do in fact contribute to said RDC metastability at F3 depends on the relative arrival times of said reset-assertion effects (transition to 0) from F1 and F2 at AND gate G. Since 0 is a controlling value for an AND gate, an earlier arriving of said reset-assertion effects from F1 or F2 is deemed to propagate to F3. If said reset-assertion effects from F1 and F2 are found to arrive at G at the same time, both are deemed to propagate to F3.

A preferred embodiment of the present method, for a specific set of reset waveforms, clock waveforms and constraints, comprises the following steps:
1. Perform Timed Boolean Analysis and path tracing to determine all RDC Metastable flip-flops.
2. For each RDC Metastable flip-flop identified in step 1,
   a. Perform path-tracing to determine all Reset-Assertion flip-flops from which reset-assertion effects have an opportunity to propagate along some path to said RDC Metastable flip-flop.
   b. Trace paths from said Reset-Assertion flip-flops to said RDC Metastable flip-flop, such that whenever reset-assertion effects from more than one said Reset-Assertion flip-flops converge at a gate, said reset-assertion effects that are propagated forward are based on relative arrival times of said reset effects at said gate and the Boolean function of said gate.
   c. Identify subset of said Reset-Assertion flip-flops such that said reset-assertion effects originating at flip-flops in said subset succeed in propagating to said RDC Metastable flip-flop.
   d. Mark said subset of Reset-Assertion flip-flops as the cause of metastability at said RDC Metastable flip-flop.
   e. Return to Step 2 to process a next RDC Metastable flip-flop.

Whereas the above embodiment is detailed enough for implementation and reproduction by practitioners of the art, it also a general approach based on which a skilled practitioner would be able to derive variations to achieve the same goal of identifying said relevant Reset-Assertion flip-flops. As such, the above embodiment must be interpreted in the widest scope possible.

Similar to the above case of multiple Reset-Assertion flip-flops propagating to a same RDC Metastable flip-flop, it is possible to also have an analogous case of multiple RDC Metastable flip-flops propagating to a single Observable flip-flop, said single Observable flip-flop being a flip-flop such that the propagation of RDC Metastability to it is considered erroneous. As in the case of multiple Reset-Assertion flip-flops, Timed Boolean Analysis and relative timing of metastability-event arrivals at gates at which paths from said multiple RDC Metastable flip-flops converge is used to determine which of said multiple RDC Metastable flip-flops are responsible for causing metastability to propagate to the said single Observable flip-flop. Only said responsible RDC Metastable flip-flops and said single Observable flip-flop are reported as causes of integrated circuit failure.

A preferred embodiment of the present method, for a specific set of reset waveforms, clock waveforms and constraints, comprises the following steps:
1. Perform Timed Boolean Analysis and path tracing to determine all RDC Metastable flip-flops as well as all Observable flip-flops, said Observable flip-flops being such that a metastability effect from one or more of said RDC Metastable flip-flops propagates to said Observable flip-flops.
2. For each Observable flip-flop identified in step 1,
   a. Perform path-tracing to determine all RDC Metastable flip-flops from which metastability effects propagate along some path to said Observable flip-flop.
   b. Trace paths from said RDC Metastable flip-flops to said Observable flip-flop, such that whenever metastability effects from more than one said RDC Metastable flip-flops converge at a gate, said metastability effects that are propagated forward are based on relative arrival times of said metastability effects at said gate and the Boolean function of said gate.
   c. Identify subset of said RDC Metastable flip-flops such that said metastability effects originating at flip-flops in said subset succeed in propagating to said Observable flip-flop.
   d. Mark said subset of RDC Metastable flip-flops as a cause of metastability propagation to said Observable flip-flop.
   e. Return to Step 2 to process a next Observable flip-flop.

Whereas the above embodiment is detailed enough for implementation and reproduction by practitioners of the art, it also a general approach based on which a skilled practitioner would be able to derive variations to achieve the same goal of identifying said relevant RDC Metastable flip-flops. As such, the above embodiment must be interpreted in the widest scope possible.

What is claimed is:

1. A method for checking metastability effects caused by reset assertion at a flip-flop in a digital integrated circuit design, said method being embodied as a set of computer instructions stored on computer readable media, said computer instructions, when loaded into a computer, causing the computer to perform the steps of said method, said metastability checking being performed for the purpose of ensuring error-free operation of said digital integrated circuit design to be fabricated, the method comprising:

determination of flip-flops where reset is asserted, said flip-flops being termed reset-assertion flip-flops;

performing path tracing from said reset-assertion flip-flops and performing propagation of timed Boolean values along said paths in said design to determine flip-flops downstream from said reset-assertion flip-flops, where value transitions caused by reset assertion at said reset-assertion flip-flops are likely to propagate, said propagation being termed reset-assertion propagation;

marking said flip-flops downstream from said reset-assertion flip-flops to be RDC Metastable if said reset-assertion propagation has the potential to cause a transition at an output of said downstream flip-flops, said transition being termed Metastability Transition;

performing path tracing from said RDC Metastable flip-flops and performing propagation of timed Boolean values along said paths in said design to determine flip-flops or design-outputs downstream from said RDC Metastable flip-flops, where value transitions caused by said Metastability Transitions at said RDC Metastable flip-flops are likely to propagate, said propagation being termed reset-metastability propagation;

marking said flip-flops downstream from said RDC Metastable flip-flops if said downstream flip-flops are being reset when a propagation effect of said Metastability Transitions arrives at said downstream flip-flops;

identifying a subset of said RDC Metastable flip-flops such that said Metastability Transitions at all flip-flops in said subset either do not propagate to any flip-flop or design-output, or only propagate to said downstream flip-flops such that a reset is being asserted at said downstream flip-flops in the time window during which a metastable value or its effects from said RDC Metastable flip-flops propagate to said downstream flip-flops;

marking said subset of RDC Metastable flip-flops as being non-observable and not causing failure in said integrated circuit;

marking said RDC Metastable flip-flops not in said subset as potentially causing failure in said integrated circuit.

2. The method of claim 1 in which said set of RDC Metastable flip-flops is further augmented with steps comprising:

determination of flip-flops such that propagation of said reset-assertion transitions is blocked from causing said Metastability Transition at outputs of said flip-flops by side-inputs in propagating paths, said side-inputs being termed Reset Clamp signals, and said flip-flops being termed Blocked flip-flops;

marking a said Blocked flip-flop as being RDC Metastable if one or more of said Reset Clamp signals associated with said Blocked flip-flop are not timed using static timing analysis to satisfy setup and hold requirements for said Blocked flip-flop.

3. The method of claim 1 in which said set of RDC Metastable flip-flops is pruned with steps comprising:

determination of whether an RDC Metastable flip-flop is a first flip-flop in a chain of flip-flops, said chain being a set of flip-flops characterized by the output of each flip-flop, except for the last flip-flop, in said chain being connected directly or through logic gates to an input of only one flip-flop in said chain, said last flip-flop in said chain being termed a Tail flip-flop;

further determination of whether said Metastability Transition is possible at said Tail flip-flop, and whether the effect of said Metastability Transition propagates to an output of another flip-flop in the fanout of said Tail flip-flop, said fanout flip-flop being termed an Error flip-flop if said effect propagates to its output;

marking said RDC Metastable flip-flop that is a first flip-flop in a chain of flip-flops as not causing failure in said integrated circuit if no said Error flip-flop is identified in the fanout of the Tail flip-flop in said chain.

4. The method of claim 1 in which said set of RDC Metastable flip-flops is pruned with steps comprising:

determination of whether the effect of a Metastability Transition at an RDC Metastable flip-flop only propagates to a downstream flip-flop that is being reset when said effect arrives at an input of said downstream flip-flop or the reset waveform of said downstream flip-flop is synchronized to a clock that is synchronous to the clock of the reset-assertion flip-flop associated with said RDC Metastable flip-flop;

marking said RDC Metastable flip-flop for which said determination is positive as not causing failure in said integrated circuit.

5. The method of claim 1 in which said set of RDC Metastable flip-flops is qualified with steps comprising:

determination of whether the reset waveform for an RDC Metastable flip-flop is synchronized to a clock relatively synchronous to the clock waveform of the reset-assertion flip-flop associated with said RDC Metastable flip-flop;

marking said RDC Metastable flip-flop for which said determination is positive as being a non-critical RDC Metastable flip-flop.

6. The method of claim 1 in which said set of RDC Metastable flip-flops is pruned with steps comprising:

determination of whether an RDC Metastable flip-flop is a first flip-flop in a synchronizer cell;

marking said RDC Metastable flip-flop that is a first flip-flop of a synchronizer cell as not causing failure in said integrated circuit.

7. The method of claim 1 in which determination of said Metastability Transition is performed at clock-gating cells instead of flip-flops;

marking a clock-gating cell as causing failure in said integrated circuit if said clock gating cell is determined to have a Metastability Transition at its output and said Metastability Transition is determined to propagate to a downstream flip-flop at which no reset is being asserted in the time window during which said Metastability Transition propagates to said downstream flip-flop.

8. The methods of claim 1 or 7 in which, for each of said RDC Metastable flip-flops or clock-gating cells that has multiple reset-assertion flip-flops associated with it, obtaining additional debug information by means of steps comprising:

determining which of said multiple reset-assertion flip-flops has its reset-assertion effect propagate the earliest to said RDC Metastable flip-flop or clock-gating cell causing a Metastability Transition at the output of said RDC Metastable flip-flop or clock-gating cell;

marking only those reset-assertion flip-flops determined in said manner in the present method, as causing metastability at said RDC Metastable flip-flop or clock-gating cell.

9. The methods of claim 1 or 7 in which, when multiple of said RDC Metastable flip-flops or clock-gating cells, have their Metastability Transitions propagate to the same downstream flip-flop or design-output, obtaining additional debug information by means of steps comprising:

determining which of said multiple RDC Metastable flip-flops or clock-gating cells has its Metastability Transition effect propagate the earliest to said downstream flip-flop or design-output;

marking only those RDC Metastable flip-flops or clock-gating cells determined in said manner in the present method, as causing failure in said integrated circuit.

* * * * *